United States Patent [19]

Anzai et al.

[11] Patent Number: 4,940,778
[45] Date of Patent: Jul. 10, 1990

[54] PROCESS FOR PREPARATION OF METHACRYLIMIDE GROUP-CONTAINING POLYMER

[75] Inventors: Hisao Anzai; Kozi Nishida, both of Ohtake; Isao Sasaki, Hiroshima; Hideaki Makino, Ohtake; Masami Ohtani, Yamaguchi, all of Japan

[73] Assignee: Mitsubishi Rayon Company, Ltd., Tokyo, Japan

[21] Appl. No.: 220,617

[22] Filed: Jul. 18, 1988

[30] Foreign Application Priority Data

Jul. 20, 1987 [JP] Japan .................. 62-179169

[51] Int. Cl.$^5$ .......................... C08F 6/00; C08F 20/52
[52] U.S. Cl. ..................................... 528/481; 525/379; 528/492
[58] Field of Search ............... 525/379; 528/481, 492

[56] References Cited

U.S. PATENT DOCUMENTS 4,246,374 1/1981 Kopchik .......................... 525/379

FOREIGN PATENT DOCUMENTS 216505 4/1987 European Pat. Off. .

OTHER PUBLICATIONS

K. Ziegenberg et al.: Copolymere aus Methacrylsäure und Dimethacryloylimid und die Abhängigkeit ihrer NMR -Spektren vom Neutralisationsgrad, Makromol. Chem. 184, 1705-1726 (1983), English translation attached.

Primary Examiner—Christopher Henderson
Attorney, Agent, or Firm—Brumbaugh, Graves, Donohue & Raymond

[57] ABSTRACT

A methacrylimide group-containing polymer having improved moldability as well as good heat resistance and transparency is prepared by heat treating a methacrylimide group-containing polymer having imide ring structural units of the formula:

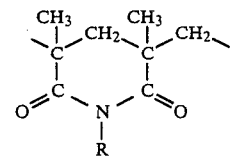

wherein R represents a hydrogen, an alkyl, cycloalkyl, aryl, alkaryl, aralkyl or allyl group 1 to 20 carbon atoms, at a temperature of 190 to 350 C. in the presence of a tertiary amine of the formula:

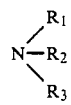

wherein $R_1$, $R_2$ and $R_3$ independently represent an alkyl, aryl, aralkyl or alkaryl group having 1 to 20 carbon atoms, and two of $R_1$, $R_2$ and $R_3$ may be linked to form a ring together with the nitrogen atom.

9 Claims, No Drawings

PROCESS FOR PREPARATION OF METHACRYLIMIDE GROUP-CONTAINING POLYMER

BACKGROUND OF THE INVENTION

1. Field of the Invention

The present invention relates to a process for the preparation of a methacrylimide group-containing polymer having an excellent heat resistance, transparency and moldability.

2. Description of the Related Art

A methacrylic polymer resin containing a methacrylimide group (hereinafter referred to as "methacrylimide group-containing polymer") is a thermo-plastic polymer resin having a high heat distortion temperature and a high transparency, as is well-known (see Japanese Examined Patent Publication No. 60-38,404 and Japanese Unexamined Patent Publication No. 59-31,012).

However, a methacrylimide group-containing polymer obtained by heat-treating a methyl methacrylate polymer in the presence of an agent capable of forming a methacrylimide ring structural unit, such as a primary amine, has a poor moldability, though the polymer retains a high heat distorsion temperature and a high transparency. The term "moldability" used in the instant specification means particularly, the processability at the injection molding conducted at a high temperature, especially a temperature of 300° C. or more. The above-mentioned conventional methacrylimide group-containing polymer has a problem in that if the temperature is not lower than 300° C. at the melt injection molding, blowing is caused or silver streaks appear in the obtained molded article, and therefore, the polymer has a poor moldability.

As the means for improving the moldability of the methacrylimide group-containing polymer, there has been tried a method in which the polymerization degree of the polymer is reduced and molding is carried out at a lower temperature.

In this method, however, since the polymerization degree of the methacrylimide group-containing polymer is reduced, reduction of the mechanical strength of the obtained molded article cannot be avoided.

SUMMARY OF THE INVENTION

Under the above-mentioned background, we carried out research with a view to providing a methacrylimide group-containing polymer having not only an excellent heat resistance and transparency but also moldability. As the result, it has been found that if the above-mentioned methacrylimide group-containing polymer is heat-treated at a temperature of from 190 to 350 C. in the presence of a tertiary amine, this problem can be solved.

More specifically, in accordance with the present invention, there is provided a process for the preparation of a methacrylimide group-containing polymer, which comprises heat-treating a methacrylimide group-containing polymer having imide ring structural units represented by the following structural formula (I):

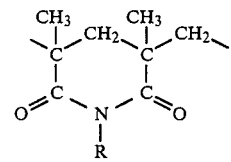

wherein R represents a hydrogen atom, a substituted or unsubstituted alkyl, cycloalkyl, aryl, alkaryl, aralkyl or allyl group having 1 to 20 carbon atoms, at a temperature of from 190 to 350 C. in the presence of a tertiary amine having the following structural formula (II):

wherein $R_1$, $R_2$ and $R_3$ independently represent an alkyl, aryl, aralkyl or alkaryl group having 1 to 20 carbon atoms, and two of $R_1$, $R_2$ and $R_3$ may be linked to form a ring together with the nitrogen atom.

DESCRIPTION OF THE PREFERRED EMBODIMENTS

The methacrylimide group-containing polymer having imide ring structural units represented by the formula (I) is advantageously prepared by a process wherein a methacrylic polymer is reacted with ammonia or a primary amine having an alkyl, cycloalkyl, aryl, aralkyl, alkaryl or allyl group having 1 to 20 carbon atoms in an inert solvent at a temperature of 150° to 350° C., preferably 200° to 330° C. A solvent capable of dissolving therein the starting methacrylic polymer and the formed methacrylimide group-containing polymer or a mixed solvent composed of two or more of such solvents is preferably used as the inert solvent. For example, there can be mentioned aromatic hydrocarbons such as benzene, toluene and xylene, and aliphatic alcohols such as methanol, ethanol and propanol.

In the methacrylimide ring structural units, R stands for a hydrogen atom, a substituted or unsubstituted alkyl, cycloalkyl, aryl, alkaryl, aralkyl or allyl group having 1 to 20 carbon atoms. A hydrogen atom, methyl, ,ethyl, n-butyl, n-hexyl, cyclohexyl and n-dodecyl groups are preferable as R. Accordingly, ammonia, methylamine, ethylamine, cyclohexylamine, n-butylamine, n-hexylamine and n-dodecylamine are preferably used as the methacrylimide ring structural unit-forming agent.

The methacrylimide group-containing polymer used in the present invention contains preferably at least 5% by weight of the imide ring structural units and more preferably at least 20% by weight of the imide ring structural units. If the content of the imide ring structural units is lower than 5% by weight, the heat distortion temperature of the polymer is low.

A homopolymer of methyl methacrylate and a copolymer of methyl methacrylate with an ethylenically unsaturated monomer copolymerizable therewith such as other methacrylic acid ester, an acrylic acid ester, styrene or α-methylstyrene can be used as the methacrylic resin for the production of the methacrylimide group-containing polymer.

As the methacrylic acid ester, there can be mentioned, for example, ethyl methacrylate, propyl methacrylate, n-butyl methacrylate, isobutyl methacrylate, t-butyl methacrylate, cyclohexyl methacrylate and benzyl methacrylate. As the acrylic acid ester, there can be mentioned, for example, methyl acrylate, ethyl acrylate, propyl acrylate, n-butyl acrylate, isobutyl acrylate, t-butyl acrylate, cyclohexyl acrylate, and benzyl acrylate.

A homopolymer of methyl methacrylate, a methyl methacrylate/methyl acrylate copolymer and a methyl methacrylate/styrene copolymer are especially preferred as the methacrylic resin to be used for the production of the methacrylimide group-containing polymer. In the above-mentioned copolymers, the methyl methacrylate unit content is not particularly critical, but it is generally preferred that the methyl methacrylate unit content be at least 70% by weight.

The methacrylimide group-containing polymer having imide ring structural units represented by the formula (I) is heat-treated in the presence of the tertiary amine represented by the structural formula (II). As the tertiary amine of the structural formula (II) to be used in the present invention, there can be mentioned, for example, trimethylamine, triethylamine, methyldiethylamine, tri-n-propylamine, tri-n-butylamine, tri-n-octylamine, dimethylaniline, triphenylamine, N-methylpyrrolidine, N-ethylpyrrolidine, N,N'-dimethylpiperazine, N-methylpiperidine, N-ethylpiperidine, N,N'-dimethylethanolamine and triallylamine. Trimethylamine and triethylamine are especially useful.

The heat treatment of the methacrylimide group-containing polymer in the presence of a tertiary amine as described above is preferably performed according to a method in which the polymer is heated in the presence of the tertiary amine in a kneader, an extruder where kneading is possible, or an autoclave in which stirring is possible. A solvent capable of dissolving therein the methacrylimide group-containing polymer can be used as a diluent at the heat treatment. Preferably, the heat treatment temperature is 190° to 350° C., especially 200° to 350° C. If the heat treatment temperature is lower than 190° C., attainment of a sufficient effect cannot be expected, and if the heat treatment temperature is higher than 350° C., thermal decomposition of the methacrylimide group-containing polymer is readily caused. The heating time depends on the temperature, but generally, the heating time is from 1 minute to 120 minutes. As the diluent, there can be used aromatic hydrocarbons such as benzene, toluene and xylene.

The amount of the tertiary amine used differs according to the molecular weight thereof, but it is generally preferred that the tertiary amine be used in an amount of at least 1 part by weight per 100 parts by weight of the methacrylimide group-containing polymer. The tertiary amine may be used in an amount larger than the amount of the methacrylimide group-containing polymer.

The methacrylimide group-containing polymer of the present invention obtained by the above-mentioned heat treatment can be mixed with a phosphite type, sulfur type or hindered phenol type antioxidant, an ultraviolet absorber, a lubricant, a fiber reinforcer, a colorant or a pigment according to the intended use.

The present invention will now be described in detail with reference to the following examples.

The following measurement methods were adopted in the following examples.

Heat distortion temperature:

The heat distortion temperature was measured according to the method of ASTM D-648-56.

Tensile strength and elongation:

The tensile strength and elongation were determined according to the method of ASTM D-638-61T.

Flexural strength and flexural modulus:

The flexural strength and flexural elastic modulus were measured according to the method of ASTM D790-63.

Moldability:

Twenty samples were molded by using a spiral mold, and the moldability was evaluated based on the molded resin temperature at which blowing was observed at the end of the flow. Note, the higher the molded resin temperature, the better the moldability. The injection molding was carried out under the following conditions.

Injection molding machine:
Model SJ-35A (supplied by Meiki Co., Ltd.), 5 ounces
Injection pressure: 78 kg/cm$^2$
Screw rotation number: 80 rpm
Back pressure, 60 kg/cm$^2$
Cycle: 60 seconds
Mold temperature: 80° C.
Mold specification: 2 mm in thickness, spiral mold

Referential Example

The preparation of a methacrylimide group-containing polymer is illustrated in this example.

An autoclave was charged with 100 parts by weight of the dried methyl methacrylate polymer having a weight average molecular weight of 100,000 together with 100 parts by weight of toluene, 10 parts by weight of methanol and a primary amine shown in Table 1, and reaction was carried out at 250° C. for 3 hours with stirring. The properties of the obtained methacrylimide group-containing polymer are shown in Table 1.

TABLE 1

| Methacrylimide Group-Containing Polymer | Primary Amine Kind | Amount Added (parts by weight) | Imide Ring Structure Content (% by weight) | Heat Distortion Temperature (°C.) |
| --- | --- | --- | --- | --- |
| M-1 | Methylamine | 15 | 45 | 125 |
| M-2 | Methylamine | 20 | 69 | 138 |
| M-3 | Methylamine | 25 | 80 | 145 |
| M-4 | Cyclohexylamine | 50 | 52 | 140 |

Examples 1 through 4

An autoclave having a capacity of 1.5 liters was charged with 100 parts by weight of the methacrylimide group-containing polymer prepared in Referential Example together with 100 parts by weight of toluene, and 35 parts by weight of trimethylamine was added. The heat treatment of the mixture was carried out at 250° C. for 30 minutes with stirring.

The obtained polymer was dried and pelletized by an extruder. The obtained pellet was dried at 90° C. a whole day and night and was then subjected to spiral molding at a resin temperature shown in Table 2 by an injection molding machine. The blowing state was observed and the moldability was evaluated. The obtained results are shown in Table 2.

A test piece for the measurement of the heat distortion temperature and a test piece for the measurement of the tensile and flexural characteristics were prepared at a resin temperature of 290° C., and the characteristics were determined. The results are shown in Table 2.

Comparative Examples 1 through 4

The methacrylimide group-containing polymer prepared in Referential Example was dried, pelletized by an extruder, dried at 90° C. a whole day and night and injection-molded in the same manner as described in Examples 1 through 4, and the moldability and characteristics were evaluated. The results are shown in Table 2.

Examples 5 through 14

An autoclave having a capacity of 1.5 liters was charged with 100 parts by weight of the methacrylimide group-containing polymer prepared in Referential Example and 100 parts by weight of toluene, and a tertiary amine shown in Table 3 were added. Then, the heat treatment was carried out at 250° C. for 30 minutes with stirring.

The moldability of the obtained polymer was evaluated in the same manner as described in Example 1. The results are shown in Table 3.

TABLE 3

| Starting Methacrylimide Group-Containing Polymer | Tertiary Amine Kind | Amount (Parts by weight) | Resin Temperature in Injection Molding Machine | | | | | |
|---|---|---|---|---|---|---|---|---|
| | | | 300° C. | 310° C. | 320° C. | 330° C. | 340° C. | 350° C. |
| Example No. | | | | | | | | |
| 5 | M-3 triethylamine | 30 | not | not | not | not | slight | observed |
| 6 | " tributylamine | 20 | not | not | not | slight | observed | — |
| 7 | " trioctylamine | 15 | not | not | slight | observed | — | — |
| 8 | " N-methylpiperidine | 30 | not | not | not | slight | observed | — |
| 9 | " N-ethylpiperidine | 30 | not | not | not | slight | observed | — |
| 10 | " N-methylpyrrolidine | 30 | not | not | not | slight | observed | — |
| 11 | " N,N'-dimethylpiperazine | 30 | not | not | not | slight | observed | — |
| 12 | " N,N'-dimethylethanolamine | 30 | not | not | not | slight | observed | — |
| 13 | " triallylamine | 30 | not | not | not | slight | observed | — |
| 14 | " trimethylamine | 30 | not | not | not | not | slight | observed |

As is shown in the examples, the methacrylimide group-containing polymer obtained according to the process of the present invention has an excellent moldability and the polymer retains the good heat resistance, transparency and mechanical characteristics of the starting methacrylimide group-containing polymer.

We claim:

1. A process for the preparation of an improved methacrylimide group-containing polymer, which comprises obtaining as a starting material a methacrylimide group-containing polymer having imide ring structural units represented by the following structural formula (I):

TABLE 2

| Starting Methacrylimide Group-Containing Polymer | Heat Treatment in Presence of Trimethylamine | Heat Distortion Temperature (°C.) | Mechanical Characteristics | | | | Moldability (blowing in spirals) Resin temperature in injection molding machine | | | | | |
|---|---|---|---|---|---|---|---|---|---|---|---|---|
| | | | Tensile Strength (kg/cm²) | Elongation (%) | Flexural modulus (kg/cm²) | Flexural Strength (kg/cm²) | 290° C. | 300° C. | 310° C. | 320° C. | 330° C. | 340° C. |
| Example No. | | | | | | | | | | | | |
| 1 | M-1 | conducted | 126 | 850 | 4.7 | 39000 | 1270 | not | not | not | not | slight | observed |
| 2 | M-2 | conducted | 138 | 850 | 4.8 | 40000 | 1300 | not | not | not | not | not | slight |
| 3 | M-3 | conducted | 145 | 870 | 5.0 | 42000 | 1330 | not | not | not | not | not | slight |
| 4 | M-4 | conducted | 141 | 800 | 4.0 | 37000 | 1120 | not | not | not | not | slight | observed |
| Comparative Example No. | | | | | | | | | | | | |
| 1 | M-1 | — | 125 | 850 | 4.7 | 39000 | 1270 | slight | observed | observed | observed | observed | observed |
| 2 | M-2 | — | 138 | 850 | 4.8 | 40000 | 1300 | not | slight | observed | observed | observed | observed |
| 3 | M-3 | — | 145 | 870 | 5.0 | 42000 | 1330 | not | slight | observed | observed | observed | observed |
| 4 | M-4 | — | 140 | 800 | 3.9 | 37000 | 1130 | slight | observed | observed | observed | observed | observed |

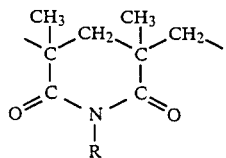

wherein R represents a hydrogen atom, a substituted or unsubstituted alkyl, cycloalkyl, aryl, alkaryl, aralkyl or allyl group containing from 1 to 20 carbon atoms; and heat-treating the starting material at a temperature of from 190° to 350° C. in the presence of a tertiary amine having the following formula (II):

wherein $R_1$, $R_2$, and $R_3$ independently represent an alkyl, aryl, aralkyl or alkaryl group having from 1 to 20 carbon atoms, and two of $R_1$, $R_2$, and $R_3$ may be linked to form a ring together with the nitrogen atom.

2. A process according to claim 1, wherein the methacrylimide group-containing polymer has at least 5% by weight of the imide ring structural units.

3. A process according to claim 1, wherein the methacrylimide group-containing polymer is prepared by reacting a methyl methacrylate polymer with ammonia or a primary amine having an alkyl, cycloalkyl aryl, aralkyl, alkaryl or allyl group having 1 to 20 carbon atoms, at a temperature of 150 to 350 C. in an inert solvent.

4. A process according to claim 3, wherein the methyl methacrylate polymer is a homopolymer of methyl methacrylate or a copolymer comprised of at least 70% by weight of methyl methacrylate and not more than 30% by weight of an ethylenically unsaturated monomer copolymerizable therewith.

5. A process according to claim 3, wherein the methyl methacrylate polymer is a homopolymer of methyl methacrylate or copolymer comprised of at least 70% by weight of methyl methacrylate and not more than 30% by weight of methyl acrylate or styrene.

6. A process according to claim 1, wherein the tertiary amine of the formula (II) is selected from the group consisting of trimethylamine and triethylamine.

7. A process according to claim 1, wherein the heat-treatment of the methacrylimide group-containing polymer is carried out by kneading or stirring the polymer together with the tertiary amine by using a kneader, extruder or an autoclave provided with a stirrer.

8. A process according to claim 1, wherein the amount of the tertiary amine used is at least one part by weight based on 100 parts by weight of the methacrylimide-group containing polymer.

9. A process according to claim 1, wherein the heat-treatment of the methacrylimide group-containing polymer is carried out in a diluent.

* * * * *

UNITED STATES PATENT AND TRADEMARK OFFICE
CERTIFICATE OF CORRECTION

PATENT NO. : 4,940,778

DATED : July 10, 1990

INVENTOR(S) : Anzai et al

It is certified that error appears in the above-identified patent and that said Letters Patent is hereby corrected as shown below:

Column 6, line 9, TABLE 3, right side (above "Resin Temperature...") insert the heading:

--Moldability (blowing in spirals)--.

Signed and Sealed this

Twenty-first Day of April, 1992

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO.  : 4,940,778

DATED       : July 10, 1990

INVENTOR(S) : Anzai et al

It is certified that error appears in the above-identified patent and that said Letters Patent is hereby corrected as shown below:

Column 6, line 9, TABLE 3, right side (above "Resin Temperature...") insert the heading:

--Moldability (blowing in spirals)--.

Signed and Sealed this

Sixteenth Day of June, 1992

Attest:

DOUGLAS B. COMER

*Attesting Officer*     Acting Commissioner of Patents and Trademarks